United States Patent [19]
Müller et al.

[11] Patent Number: 5,905,133
[45] Date of Patent: May 18, 1999

[54] PROCESS FOR THE CONTINUOUS PRODUCTION OF THERMOPLASTICALLY PROCESSABLE POLYURETHANES HAVING IMPROVED PROCESSING BEHAVIOR

[75] Inventors: Friedemann Müller, Neuss; Wolfgang Bräuer, Leverkusen; Herbert Heidingsfeld, Frechen; Wolfgang Röhrig, Bergisch Gladbach; Hans-Georg Hoppe, Leichlingen; Jürgen Winkler, Langenfeld, all of Germany

[73] Assignee: Bayer Aktiengesellschaft, Germany

[21] Appl. No.: 08/880,464

[22] Filed: Jun. 23, 1997

[30] Foreign Application Priority Data

Jun. 28, 1996 [DE] Germany ............... 196 25 987

[51] Int. Cl.⁶ .................................................. C08G 18/10
[52] U.S. Cl. ........................ 528/61; 528/65; 264/211.24
[58] Field of Search ................... 528/61, 65; 264/211.24

[56] References Cited

U.S. PATENT DOCUMENTS

| 3,963,679 | 6/1976 | Ullrich et al. | 264/211 |
| 4,190,711 | 2/1980 | Zdrahala et al. | 521/112 |

FOREIGN PATENT DOCUMENTS

| 0 230 662 | 8/1987 | European Pat. Off. . |
| 0 571 830 | 12/1993 | European Pat. Off. . |
| 0 598 283 | 5/1994 | European Pat. Off. . |
| 20 59 570 | 12/1970 | Germany . |
| 19 64 834 | 7/1971 | Germany . |
| 22 48 382 | 4/1974 | Germany . |
| 1 057 018 | 2/1967 | United Kingdom . |

OTHER PUBLICATIONS

Orbit Abstract of DE 19 64 834 (Jul. 1, 1971).
Orbit Abstract DE 22 48 382 (Apr. 11, 1974).
Thermoplastic Urethane Elastomers. I. Effect of Soft–Segment Variations, *Journal of Applied Polymer Science*, vol. 19, (1975), pp. 2493–2502.
Thermoplastiche Polyurethan–Elastomere–Eigenschaften und Anwendungen, *Kunstoffe 68*, vol. 12, (1978), pp. 819–825.
Derzeitige Erkenntnisse über physikalische und chemische Vorgänge bei der thermischen und thermo–oxidativen Beanspruchung von Polyurethanelastomeren, Kautschue+ Gummi, *Konstoffe 35*, Jahrgang, Jul. 1982, pp. 568–584.
Orbit Abstract DE 20 59 570 (Dec. 3, 1970).
Orbit Abstract of EP 0 571 830 (Dec. 1, 1993).
Orbit Abstract of EP 0 598 283 (May 25, 1994).

*Primary Examiner*—Rachel Gorr
*Attorney, Agent, or Firm*—Connolly and Hutz

[57] ABSTRACT

The present invention relates to a process for the continuous production of thermoplastically processable polyurethanes having improved processing behaviour, wherein in a multi-step reaction A) one or more linear hydroxyl-terminated polyols a) having a molecular weight of from 500 to 5000 are mixed continuously with a proportion of an organic diisocyanate b) in an NCO:OH ratio of from 2.0:1 to 5.0:1, in a mixing unit at high shear energy, B) the mixture prepared in step A) is reacted continuously to form an isocyanate-terminated prepolymer in a reactor at temperatures of >120° C., until a conversion of >90%, referred to component a), is achieved, C) the prepolymer prepared in step B) is mixed with the remainder of component b), an NCO:OH ratio of from 2.05:1 to 6:1 being established overall in steps A) to C) and an NCO:OH ratio of 0.9 to 1.1 being established when all the components of steps A) to F) are included, D) the mixture prepared in step C) is cooled to a temperature of <190° C., E) the mixture obtained in step D) is mixed continuously and intensively for a maximum of 5 seconds with one or more diol and optionally triol and/or diamine chain extenders c) having a molecular weight of from 60 to 500 and F) the mixture obtained in step E) is reacted continuously in a different reactor from that used in step B), to form the thermoplastic polyurethane.

9 Claims, No Drawings

PROCESS FOR THE CONTINUOUS PRODUCTION OF THERMOPLASTICALLY PROCESSABLE POLYURETHANES HAVING IMPROVED PROCESSING BEHAVIOR

The invention relates to a multistep process for the continuous production of thermoplastically processable polyurethanes having improved processing behaviour, by previous lengthening of the flexible segments.

Thermoplastic polyurethane elastomers have been known for a long time. They are of industrial importance because of the combination of high-quality mechanical properties with the well-known advantages of economical thermoplastic processability. A wide variation in the range of mechanical properties can be obtained through the use of different chemical structural components. There is a survey of TPUs, their properties and applications, for example, in Kunststoffe 68 (1978), pages 819 to 825, or in Kautschuk, Gummi, Kunststoffe 35 (1982), pages 568 to 584.

TPUs are synthesised from linear polyols, mostly polyester polyols or polyether polyols, organic diisocyanates and short-chain diols (chain extenders). Catalysts may also be added to accelerate the formation reaction. To adjust the properties, the structural components can be varied within relatively wide molar ratios. Molar ratios of polyols to chain extenders of 1:1 to 1:12 have proved successful, resulting in products in the range of 70 Shore A to 75 Shore D.

The TPUs can be produced continuously or in batches. The best-known industrial production processes are the belt process (GB 1 057 018) and the extruder process (DE 1 964 834 and 2 059 570).

For improving the processing behaviour, factors of great interest are, in the case of injection-moulded articles, a rapid release from the mould and, in the case of extruded products, an increased stability in the melt extractor and in the profile extruding machine, with ready melting of the TPU. The morphology of the TPUs, that is, the specific recrystallisation behaviour, is of prime importance as regards the mould release behaviour and the stability.

The appropriate morphology for an improved processing behaviour, in the case of products which have been produced by conventional processes, is obtained only where there are high proportions of rigid segments (chain extender+diisocyanate). The mobility of the flexible segment (polyol+diisocyanate) is so restricted thereby that the cold flexibility and the flow behaviour are impaired. Moreover the degree of hardness of the product is simultaneously increased.

The alteration of the morphology by increasing the molecular weight of the polyol leads to a greater phase separation and to improved mechanical values but, owing to the simultaneous decrease in the proportion of rigid segments, to a distinct reduction in the hardness (Seefried et al., J. Appl. Pol. Sci. 19, 2493, 1975). For this reason an improved recrystallisation behaviour is not reported.

In an established recipe, the morphology is also gradually influenced where there is an alteration in the order in which the structural components are charged. In the past, the route via the flexible segment prepolymer was mainly adopted. In the most common variant, the polyol is reacted with the entire quantity of diisocyanate. The chain extension using the low-molecular diol takes place in a second step. The main reason is the balancing of the reactivities of polyol and chain extender in order to achieve better dissipation of heat. First of all the PU reaction with the less reactive polyol is carried out, and then the reaction with the more active short-chain diol. Because of the high molar excess of diisocyanate in the prepolymer step, only a minor degree of lengthening of the polyols is established. Morphologically a greater phase separation takes place, which leads to an increase in the mechanical properties (Wilkes et al., J. Appl. Pol. Sci. 29, 2695, 1984). For this reason an improved recrystallisability is not reported. Meisert et al. (DE 2 248 382) describe another flexible-segment prepolymer process. As a result of reacting an excess of polyol with diisocyanate, an OH-terminated prepolymer is produced which, in a subsequent step, is reacted with the chain extender and with a diisocyanate different from that employed in the first step. By this means the inventors achieve a widening of the melting range and subsequently more homogeneous films than in the case of the conventional one-step reaction. An improvement in the recrystallisability was not observed in these examples either.

EP 0 571 830 describes how a TPU having an elevated recrystallisation temperature compared with the standard processes is obtained in a simple batch process by reacting 1 mol of polyol with 1.1 to 5.0 mol of diisocyanate, incorporation of the remainder of the diisocyanate and subsequent chain extension. However, owing to the production process, the resulting products give rise to films containing pinholes and are therefore unsuitable for processing by extrusion.

The elevated melting temperatures are also disadvantageous in processing, in particular in the diisocyanate/polyol ratio of 1.5 to 2.0 given in the Examples.

The problem of improving the processing of TPU by increasing the recrystallisability, at the same time with a good melting behaviour accompanied by a largely constant hardness range and cold behaviour has therefore hitherto still not been solved satisfactorily.

It has now been found that the requirement described above can be satisfied by the accurate carrying out of a new process for effecting previous lengthening of the flexible segments.

The invention accordingly provides a process for the continuous production of thermoplastically processable polyurethanes having improved processing behaviour, characterised in that, in a multistep reaction A) one or more linear hydroxyl-terminated polyols a) having a molecular weight of from 500 to 5000 are mixed continuously with a proportion of an organic diisocyanate b) in an NCO:OH ratio of from 2.0:1 to 5.0:1, in a mixing unit at high shear energy, B) the mixture prepared in step A) is reacted continuously to form an isocyanate-terminated prepolymer in a reactor at temperatures of >120° C., until a conversion of >90%, referred to component a), is achieved, C) the prepolymer prepared in step B) is mixed with the remainder of component b), an NCO:OH ratio of from 2.05:1 to 6:1 being established overall in steps A) to C) and an NCO:OH ratio of 0.9 to 1.1 being established when all the components of steps A) to F) are included, D) the mixture prepared in step C) is cooled to a temperature of <190° C., E) the mixture obtained in step D) is mixed continuously and intensively for a maximum of 5 seconds with one or more diol and optionally triol and/or diamine chain extenders c) having a molecular weight of from 60 to 500 and F) the mixture obtained in step E) is reacted continuously in a different reactor from that used in step B), to form the thermoplastic polyurethane.

Organic diisocyanates suitable for use as component b) are, for example, aliphatic, cycloaliphatic, araliphatic, heterocyclic and aromatic diisocyanates, such as are described, for example, in Justus Liebigs Annalen der Chemie, 562, pages 75 to 136.

In particular, the following examples may be mentioned: aliphatic diisocyanates, such as hexamethylene diisocyanate, cycloaliphatic diisocyanates, such as isophorone diisocyanate, 1,4-cyclohexane diisocyanate, 1-methyl-2,4- and -2,6-cyclohexane diisocyanate as well as the corresponding mixtures of isomers, 4,4'-, 2,4'- and 2,2'-dicyclohexylmethane diisocyanate as well as the corresponding mixtures of isomers and aromatic diisocyanates, such as 2,4-tolylene diisocyanate, mixtures of 2,4- and 2,6-tolylene diisocyanate, 4,4'-diphenylmethane diisocyanate, 2,4'-diphenylmethane diisocyanate and 2,2'-diphenylmethane diisocyanate, mixtures of 2,4'-diphenylmethane diisocyanate and 4,4'-diphenylmethane diisocyanate, urethane-modified liquid 4,4'-diphenylmethane diisocyanates and/or 2,4'-diphenylmethane diisocyanates, 4,4'-diisocyanatodiphenyl-1,2-ethane and 1,5-naphthylene diisocyanate. It is preferable to use 1,6-hexamethylene diisocyanate, isophorone diisocyanate, dicyclohexylmethane diisocyanate, mixtures of isomers of diphenylmethane diisocyanate having a content of 4,4'-diphenylmethane diisocyanate of more than 96 wt.% and, in particular, 4,4'-diphenylmethane diisocyanate and 1,5-naphthylene diisocyanate. The above-mentioned diisocyanates may be used separately or in the form of mixtures with one another. They may also be used together with up to 15% of a polyisocyanate (calculated with reference to total diisocyanate), but at most only so much polyisocyanate that the resulting product is thermoplastically processable. Examples are triphenylmethane-4,4',4"-triisocyanate and polyphenylpolymethylene polyisocyanates.

Linear hydroxyl-terminated polyols having a molecular weight of from 500 to 5000 are used as component a). Owing to the method of their production, these often contain small quantities of non-linear compounds. For this reason they are also frequently referred to as "substantially linear polyols". Polyester diols, polyether diols, polycarbonate diols or mixtures of these are preferred.

Suitable polyether diols can be prepared by reacting one or more alkylene oxides having 2 to 4 carbon atoms in the alkylene group with a starter molecule containing two bonded active hydrogen atoms. Alkylene oxides which may be mentioned are, for example, ethylene oxide. 1,2-propylene oxide, epichlorhydrin and 1,2-butylene oxide and 2,3-butylene oxide. Preferably ethylene oxide, propylene oxide and mixtures of 1,2-propylene oxide and ethylene oxide are used. The alkylene oxides may be used separately, alternating with one another or as mixtures. Examples of suitable starter molecules are water, aminoalcohols such as N-alkyldiethanolamines, for example, N-methyldiethanolamine, and diols such as ethylene glycol, 1,3-propylene, glycol, 1,4-butanediol and 1,6-hexanediol. Optionally mixtures of starter molecules may also be used. Other suitable polyetherols are the hydroxyl-containing polymerisation products of tetrahydrofuran. Trifunctional polyethers may also be used in quantities of 0 to 30 wt. %, referred to the bifunctional polyethers, but at most in a quantity such that the resulting product is thermoplastically processable. The substantially linear polyether diols have molecular weights preferably of from 500 to 5000. They may be used both separately and in the form of mixtures with one another.

Suitable polyester diols can be prepared, for example, from dicarboxylic acids having 2 to 12 carbon atoms, preferably 4 to 6 carbon atoms, and polyhydric alcohols. Suitable dicarboxylic acids are, for example, aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids may be used separately or as mixtures, for example, in the form of a mixture of succinic, glutaric and adipic acids. To prepare the polyester diols, it may optionally be advantageous to use, instead of the dicarboxylic acids, the corresponding dicarboxylic acid derivatives, such as carboxylic diesters having 1 to 4 carbon atoms in the alcohol group, carboxylic anhydrides or carboxylic acid chlorides. Examples of polyhydric alcohols are glycols having 2 to 10, preferably 2 to 6 carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. Depending on the properties required, the polyhydric alcohols may be used alone or optionally mixed with one another. Also suitable are esters of carbonic acid with the above-mentioned diols, in particular those having 4 to 6 carbon atoms, such as 1,4-butanediol and/or 1,6-hexanediol, condensation products of ω-hydroxycarboxylic acids, for example, ω-hydroxycaproic acid and preferably polymerisation products of lactones, for example, optionally substituted w-caprolactones. Polyester diols preferably used are ethanediol polyadipates, 1,4-butanediol polyadipates, ethanediol-1,4-butanediol polyadipates, 1,6-hexanediol-neopentyl glycol polyadipates, 1,6-hexanediol-1,4-butanediol polyadipates and polycaprolactones. The polyester diols have molecular weights of from 500 to 5000 and may be used separately or in the form of mixtures with one another.

Diols or diamines having a molecular weight of from 60 to 500 are used as chain extenders c), preferably aliphatic diols having 2 to 14 carbon atoms such as, for example, ethanediol, 1,6-hexanediol, diethylene glycol, dipropylene glycol and, in particular, 1,4-butanediol. However, diesters of terephthalic acid with glycols having 2 to 4 carbon atoms are also suitable, for example, bisethylene glycol terephthalate or bis- 1,4-butanediol terephthalate, hydroxyalkylene ethers of hydroquinone such as, for example, 1,4-di(β-hydroxyethyl)hydroquinone, ethoxylated bisphenols such as, for example, 1,4-di(β-hydroxyethyl)bisphenol A, (cyclo) aliphatic diamines such as, for example, isophoronediamine, ethylenediamine, 1,2-propylenediamine, 1,3-propylenediamine, N-methylpropylene- 1,3-diamine, N,N'-dimethylethylenediamine and aromatic diamines such as, for example, 2,4-tolylenediamine and 2,6- tolylenediamine, 3,5-diethyl-2,4-tolylenediamine and primary mono-, di-, tri-, and/or tetraalkyl-substituted 4,4'-diaminodiphenylmethanes. Mixtures of the above-mentioned chain extenders may also be used. Besides these smaller quantities of triols may also be added.

Furthermore conventional monofunctional compounds, for example, as chain stoppers or mould-release agents, may also be added in small quantities. Examples which may be mentioned are alcohols such as octanol and stearyl alcohol or amines such as butylamine and stearylamine.

In order to prepare the TPUs, the structural components, optionally in the presence of catalysts and auxiliary substances and/or additives, can be reacted in quantities such that the equivalent ratio of NCO groups to the sum of the groups reactive with isocyanate, in particular the OH groups of the low-molecular diols/triols and polyols, is from 0.9:1.0 to 1.1:1.0, preferably from 0.95:1.0 to 1.10:1.0.

Suitable catalysts according to the invention are the conventional tertiary amines known in prior art such as, for example, triethylamine, dimethylcyclohexylamine, N-methylmorpholine, N,N'-dimethylpiperazine, 2-(dimethylaminoethoxy)ethanol, diazabicyclo[2.2.2]octane and the like as well as in particular organometallic compounds, such as titanic esters, iron compounds, tin compounds, for example, tin diacetate, tin dioctoate, tin dilaurate or the dialkyltin salts of aliphatic carboxylic acids, such as dibutyltin diacetate, dibutyltin dilaurate or the like. Preferred catalysts are organometallic compounds, in particular titanic esters, iron compounds and/or tin compounds.

Besides the TPU components and the catalysts, auxiliary substances and/or additives may also be introduced. Examples which may be mentioned include lubricants, such as fatty esters, the metallic soaps thereof, fatty acid amides, fatty ester amides and silicone compounds, antiblocking agents, inhibitors, stabilisers against hydrolysis, light, heat and discoloration, flameproofing agents, dyes, pigments, inorganic and/or organic fillers and reinforcing agents. Reinforcing agents used are in particular fibrous reinforcing materials, for example, inorganic fibres, which are produced as in prior art and can also be treated with a size. More detailed information regarding the above-mentioned auxiliary substances and additives may be found in the specialist literature, for example, in the monograph by J. H. Saunders and K. C. Frisch entitled "High Polymers", Volume XVI, Polyurethanes, Parts 1 and 2, Interscience Publishers 1962 and 1964, respectively, in Taschenbuch fur Kunststoff-Additive, by R. Gächter and H. Müller (Hanser Verlag, Munich, 1990) or in DE-A 29 01 774.

Other additives which may be incorporated into the TPU are thermoplastics, for example, polycarbonates and acrylonitrile-butadiene-styrene terpolymers, in particular ABS. Other elastomers such as rubber, ethylene-vinyl acetate copolymers, styrene-butadiene copolymers as well as other TPUs may likewise be used. Commercially available plasticisers such as phosphates, phthalates, adipates, sebacates and alkylsulphonic esters are also suitable for incorporation.

The continuous production process according to the invention is carried out as follows:

The quantities of the reaction components for the formation of the prepolymer in step A) are selected according to the invention so that the NCO/OH ratio of the portions of diisocyanate b) and polyol a) is 2.0:1 to 5.0:1, preferably 2.05:1 to 3.0:1. The components are mixed continuously in a unit at high shear energy. For example, a mixer head, preferably a high-speed toothed mixer, or a nozzle may be used.

The prepolymer reaction in step B) is carried out continuously in a reactor, for example, a tubular reactor. A tube equipped with static mixers or a stirred tube (in-line mixer) having a ratio of length to diameter of greater than 4:1 are preferred.

In a particularly preferred embodiment, the steps A) and B) are carried out in apparatus comprising a nozzle/tube with static mixers, or in the in-line mixer.

The prepolymer reaction of step B) should according to the invention be taken substantially to completion. that is, a conversion of more than 90 mol-%, referred to polyol. The reaction temperatures are above 120° C., preferably between 140° C. and 220° C.

In step C), the second portion of the diisocyanate a) is incorporated continuously by rapid mixing. Preferably one or more static mixers in a tube are used for this purpose. A nozzle. a mixer head or the mixing elements of an extruder may however also be used.

The mixture prepared in C) is cooled to a temperature of below 190° C., preferably below 170° C., in step D). A tube, cooled if necessary, or the cooled parts of an extruder equipped with conveyor elements are again suitable for this. The cooling is preferably carried out in a twin-shaft extruder cooled externally.

In step E), the chain extender c) is incorporated into the cooled prepolymer mixture within less than 5 seconds. A mixing unit operating at high shear energy is also preferred for this step. Examples which may be mentioned are a mixer head, a nozzle or a high-speed screw extruder having a low mixing volume. The intensive mixing is preferably carried out using the mixing elements of an extruder.

In step F), the reaction mixture is reacted continuously, in a different reactor from that used in step B), to form the thermoplastic polyurethane. High-viscosity reactors are particularly suitable for this purpose. Examples which may be mentioned are continuously operating kneaders and extruders such as, for example, Buss kneaders, single-shaft and twin-shaft extruders. Twin-shaft extruders are preferred. The reaction temperature is 140° C. to 240° C.

The TPU produced according to the invention can be processed into injection-moulded articles, into films, into coating materials or into fibres. In injection-moulding applications, it is distinguished by a greatly improved release from the mould at low melting temperature, which renders possible a shortened cycle time for the operator carrying out the injection moulding. In the case of extruded products, in addition to the excellent melting behaviour, an improved stability of the tubular film and a film having greater homogeneity result from the use of the TPU produced according to the invention.

In the following Examples. the results of DSC (differential scanning calorimetry) measurements are given as a measure of the morphological alterations according to the invention which are described above. In this connection, the crystallisation temperature $T_C$ correlates with the recrystallisability (C. S. Schollenberger, Abstr. Pap. Am. Chem. Soc. 1979, 83; J. Foks et al., Eur. Pol. J. 25, 31).

The DSC measurements are carried out on a DSC-7 from the firm Perkin Elmer. The TPU product is heated up from −70° C. to 260° C. at a rate of 20° C./min in a nitrogen atmosphere, then cooled to −70° C. at 40° C./min. The exothermic peak in the cooling phase represents the recrystallisation.

EXAMPLES 1 to 9

In the table, the invention is explained by means of some Examples. The production processes used are described below.

Production process for TPU—Process 1

(Prepolymer process not according to the invention)

The polyol, in which 150 ppm (referred to polyol) tin dioctoate had been dissolved as catalyst, was heated to 140° C. and metered continuously into the first housing of a ZSK 83 (firm: Werner/Pfleiderer). The total quantity of 4,4'-diphenylmethane diisocyanate (60° C.) was introduced into the same housing. 1,4-butanediol was conveyed continuously into the seventh housing. The thirteen housings of the ZSK were heated, increasing from 140° C. to 240° C. The rate of rotation of the screw was 300 rev/min. The metering rate was adjusted so that the residence time of the reaction components in the ZSK was approximately 1 minute.

At the end of the screw. the hot melt was withdrawn as a strand, cooled in the water bath and granulated.

Production process for TPU—Process 2
(Previous lengthening of the flexible segments)

The polyol, in which 150 ppm (referred to polyol) tin dioctoate has been dissolved as catalyst, was heated to 150° C. and metered continuously into an in-line mixer operating at 1500 rev/min. At the same time, the first portion of 4,4'-diphenylmethane diisocyanate (60° C.) was pumped into the in-line mixer. The in-line mixer had a ratio of length to diameter of 8:1. Within about 1 minute, the prepolymer formed in the in-line mixer had reacted to the extent of 99 mol-%, referred to the polyester.

The second portion of the 4,4'-diphenylmethane diisocyanate was incorporated into the prepolymer within 5 seconds, using a static mixer (firm Sulzer).

The reaction mixture was metered into the first housing of the ZSK 83 and cooled to approximately 140° C. during its passage through the following housings.

The 1,4-butanediol was metered into the fifth housing; the 1,4-butanediol was incorporated into the prepolymer by means of a brief intensively-stirring mixing element under the sixth housing.

In the last section of the screw, the reaction components were reacted to form the TPU. The reaction temperatures were 150° C. to 220° C. The rate of rotation of the screw was 300 rev/min.

At the end of the screw, the hot melt was withdrawn as a strand, cooled in the water bath and granulated.

Production process for TPU—Process 3
(Previous lengthening of the flexible segments)

This process was carried out similarly to Process 2. The mixing of prepolymer components and the formation were not carried out in the in-line mixer, but in the combination of apparatus comprising a nozzle/tube with static mixer (firm Sulzer) under otherwise identical conditions.

Production of blown films

The granular TPU is melted in a single-shaft extruder 30/25D Plasticorder PL 2000-6 from the firm Brabender (metering rate 3 kg/h; 185–205° C.) and extruded through a blown-film head to form a tubular film.

Production of the injection mouldings

The granular TPU is melted in an injection-moulding machine D 60 (32-screw) from the firm Mannesmann (temperature of composition, approx. 225° C.) and shaped into rods (shaping temperature 40° C.; rod size: 80×10×4 mm).

The Examples according to the invention of the previous, lengthening of the flexible segments with an NCO/OH ratio of greater than 2.0 exhibit a distinct rise in the recrystallisation temperatures as compared with the standard prepolymer process. This is the cause of a more rapid curing of injection mouldings and an improved stability in the films. The production process according to the invention leads to a better homogeneity of the films.

The previous lengthening of the flexible segments with an NCO/OH ratio of less than 2.0 raises the melting temperature so that both the homogeneity of the films and the stability are again impaired, because of pressure variations in the extruder.

We claim:

1. A process for the continuous production of thermoplastically processable polyurethanes having improved processing behavior, wherein in a multistep reaction A) one or more linear hydroxy-terminated polyols a) having a molecular weight of from 500 to 5000 are mixed continuously with a portion of an organic diisocyanate b) in an NCO:OH ratio of from 2.0:1 to 5.0:1 in a mixing unit at high shear energy, B) the mixture prepared in step A) is reacted continuously to form an isocyanate-terminated prepolymer in a reactor at temperatures of >120° C. until a conversion of >90%, referred to component a) is achieved, C) the prepolymer prepared in step B) is mixed with the remainder of component b), an NCO:OH ratio of from 2.05:1 to 6:1 being established overall in steps A) to C) and an NCO:OH ratio of 0.9:1 to 1.1:1 being established when all the components of steps A) to F) are included, D) the mixture prepared in step C) is cooled to <190° C.

E) the mixture obtained D) is mixed continuously and intensely for a maximum of 5 seconds with one or more diol and optionally triol and/or diamine chain extenders c) each of the diol, triol and diamine having a molecular weight of from 60 to 500 and F) the mixture obtained in step E) is reacted continuously in a different reactor from that used step B), to form the thermoplastic polyurethane.

2. The process of claim 1, wherein the polyol a) is polyester, polyether, polycarbonate or a mixture of these.

3. The process of claim 1, wherein the diol chain extender is ethylene glycol, butanediol, hexanediol, 1,4-di(β-hydroxyethyl)hydroquinone, or 1,4-di(β-hydroxyethyl) bisphenol A.

TABLE

| Examples | Process | mol polyol | mol butane-diol | mol MDI 1st Pt. | mol MDI 2nd Pt. | $T_C$ (DSC) °C. | Temperature at MVR = 3 cm³/10 min °C. | Homogeneity of films | Stability of blown films | Injection moulding: hardness 10 sec after release from mould % of final hardness |
|---|---|---|---|---|---|---|---|---|---|---|
| 1* | 1 | 1 | 2.54 | 3.54 | 0 | 87 | 188 | satisfactory | poor | 74 |
| 2 | 2 | 1 | 2.54 | 2.45 | 1.09 | 118 | 185 | good | good | 89 |
| 3* | 2 | 1 | 2.54 | 1.54 | 2.0 | 122 | 205 | poor | satisfactory | 91 |
| 4* | 1 | 1 | 1.60 | 2.60 | 0 | 75 | 185 | satisfactory | poor | — |
| 5 | 3 | 1 | 1.60 | 2.10 | 0.50 | 81 | 187 | good | good | — |
| 6* | 3 | 1 | 1.60 | 1.60 | 1.00 | 84 | 195 | poor | satisfactory | — |
| 7* | 1 | 1 | 3.0 | 4.00 | 0 | 138 | 202 | satisfactory | poor | — |
| 8 | 2 | 1 | 3.0 | 2.25 | 1.75 | 144 | 208 | good | good | — |
| 9* | 2 | 1 | 3.0 | 1.75 | 2.25 | 144 | 216 | poor | satisfactory | — |

*Comparison Example
Examples 1–3: polyol: 1,4-butanediol polyadipate (molecular weight approx. 2200)
Examples 4–6: polyol: 1,4-butanediol polyadipate (molecular weight approx. 900)
Examples 7–9: polyol: polybutanediol ether (molecular weight approx. 1000)

4. The process of claim 1, wherein the diisocyanate is a mixture of isomers of diphenylmethane diisocyanate having a content of 4,4'-diphenylmethane diisocyanate of more than 96 wt. %.

5. The process of claim 1, wherein steps A) and B) are carried out in a nozzle with connecting static mixers or in a stirred tube having a ratio of length to diameter of greater than 4:1.

6. The process of claim 1, wherein step C) is carried out in one or more static mixers.

7. The process of claim 1, wherein steps D), E) and F) are carried out in a twin-shaft extruder, with intensively mixing screw elements being used in step E).

8. The process of claim 1, wherein the diisocyanate is 4,4'-diphenylmethane diisocyanate.

9. The process of claim 1, wherein steps D), E) and F) are carried out in a twin-shaft extruder.

* * * * *